Nov. 8, 1966  E. V. WOOSTER  3,283,713
CREDIT CARD
Filed Feb. 9, 1966
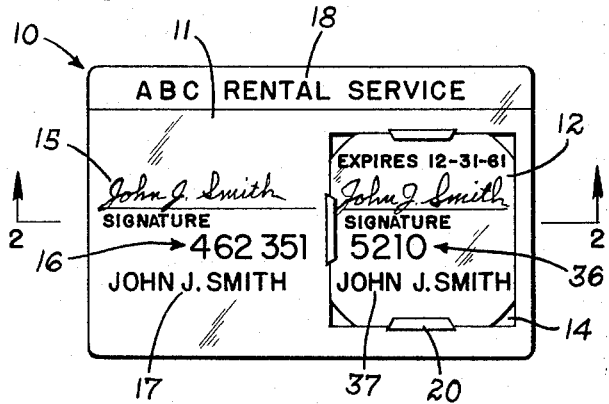
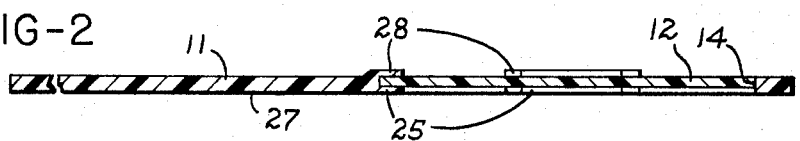
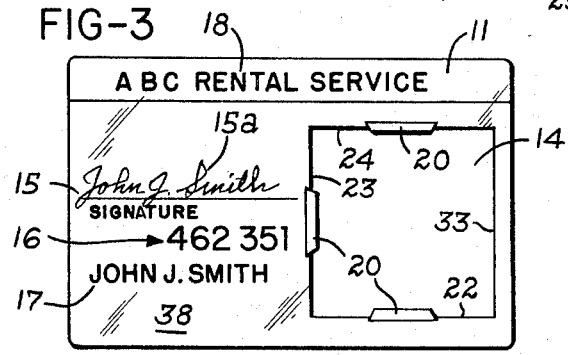
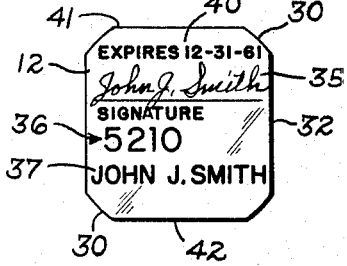
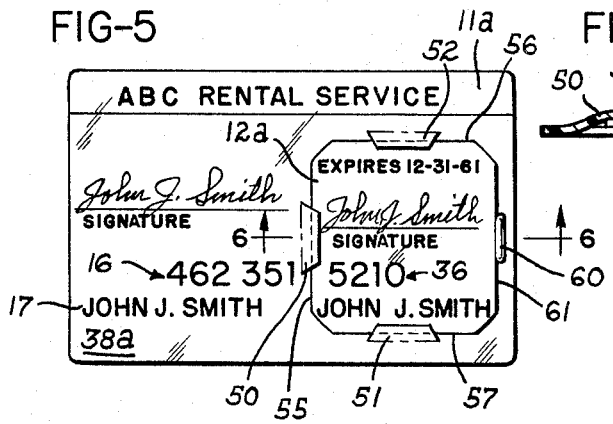
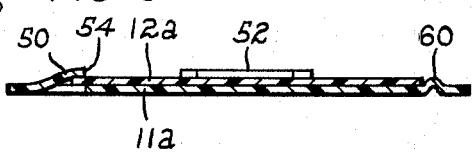
INVENTOR.
EARL V. WOOSTER
BY
Marechal, Biebel, French & Bugg
ATTORNEYS United States Patent Office 3,283,713
Patented Nov. 8, 1966

3,283,713
CREDIT CARD
Earl V. Wooster, 310 Schenck Ave., Dayton, Ohio
Filed Feb. 9, 1966, Ser. No. 526,295
7 Claims. (Cl. 101—369)

This invention relates to credit cards, and particularly to printing plates which are used to facilitate credit sales of products and services.

Large oil companies, department stores, and private firms have for many years issued credit cards to their customers for use in charging products and services. These credit cards generally comprise a rectangular plastic plate which has embossed therein the serial number of the charge account and the name of the credit card holder. An area is also usually provided for the holder of the credit card to put his signature thereon.

To use the credit card, the holder makes the desired purchase and then hands the credit card to the vendor who places the credit card in a small manual printing machine. At the same time the vendor fills out a charge slip which consists of several copies and by writing thereon the description and cost for the particular item or service which has been purchased. The charge slip is then placed in the printing machine and the machine actuated so that the charge slip is pressed against the credit card by an inked roller which prints the serial number and the name of the holder on the charge slip. The credit card holder then signs the charge slip and the vendor compares the signature with that on the credit card, and then the card and a copy from the charge slip are given to the holder.

One serious disadvantage in the credit card is that the various companies require, as part of the contract with the credit card holder, that they be responsible for any unauthorized charges made on the card before the company is notified that the card has been lost, stolen or misappropriated. Frequently, it has found that a wallet is lost with the credit cards therein and the finder is able to charge hundred of dollars on the credit card before the owner of the wallet realizes that it is missing.

Accordingly, an important object of this invention is to provide a foolproof and inexpensive credit card wherein no unauthorized charges can be made.

Another object of this invention is to provide a credit card consisting of two pieces which are placed together immediately prior to use, and particularly to provide such a two-piece credit card wherein the signature of the holder, the printed name of the holder, and portions of the serial number appear on the individual pieces of the card.

Another object of this invention is to provide a two-piece credit card of the aforesaid type wherein one piece consists of a base plate having a recess or small opening therein and the second piece consists of a small token which can be conveniently carried in the pocket of the holder, and further to provide a two-piece credit card of this type wherein the token can be easily and releasably secured to the base plate in a minimum of time and without tools.

These and other objects and advantages of the invention will be apparent from the following description, the accompanying drawings and the appended claims.

In the drawings:

FIG. 1 is a front view of the credit card shown with the two pieces assembled;

FIG. 2 is a sectional view taken centrally through the assembled credit card along the line 2—2 of FIG. 1;

FIG. 3 is a front view thereof with the token portion removed;

FIG. 4 is a plan view of the token portion of the credit card;

FIG. 5 is a front view of another embodiment of the invention; and

FIG. 6 is a sectional view taken along the line 6—6 of FIG. 5.

Referring to the drawings wherein preferred embodiments of the invention are shown, FIG. 1 illustrates the assembled credit card 10 which consists of a rectangular base card 11 having a token 12 removably connected thereto. Specifically, the rectangular base card 11 consists of a relatively thin material such as plastic or metal and has a square aperture 14 formed in the right-hand portion of the card. In the left-hand portion thereof a space 15 is provided for the signature 15a of the credit card holder, and it is generally necessary that the surface of the card be roughened or otherwise specially prepared to receive the ink of a pen so that the card can be signed by the holder. Below the signature space 15, a first portion 16 of the serial number is embossed into the base card 11 by deforming the card in conventional manner. In plastic cards, this is accomplished with an embossing machine which usually applies heat to the card during the deforming operation. Similarly, below the first portion 16 of the serial number, the credit card holder's name 17 is embossed permanently in the card. Other printed material can be placed on the card as desired, for example, the name 18 of the company issuing the credit card 10.

The aperture 14 extends through the base card and has a pair of lips 20 formed on at least three side edges 22, 23, and 24 thereof, as shown in FIG. 2. Each pair of lips 20 consists of a back lip 25 which extends in the plane from the back side 27 of the card into the aperture 14, and a front lip 28 which is parallel to the back lip 25 and extends into the aperture coextensively therewith.

The token 12 is generally square and has an outer size complementary to the size of the aperture 14. The corners 30 of this token are rounded so as not to be sharp to facilitate handling and carrying of the token in the pocket of the credit card holder. As shown in FIG. 4, the token 12 has a thickness which is slightly less than the thickness of the base card 11 and substantially equal to the distance between the lips 25 and 28. Thus the token can be manually slipped into the aperture 14 by slightly deforming the token 12 and forcing it between the various pairs of lips. When in position, the right-hand edge 32 of the token will drop below the right-hand edge 33 of the aperture 14 and be held firmly in position.

The token 12 also has a signature space 35 formed thereon in substantially the same manner as the signature space provided on the base card. A second portion 36 of the serial number is embossed on the token in horizontal alignment with the first portion 16 thereof, and the credit card holder's name 37 is also embossed below the second portion 36 of the serial number. The first and second portions 16 and 36 of the serial number and both names 17 and 37 project above the front surface 38 of the credit card 10 a distance above the upper lips 28 so that, when the card 10 is placed into the printing machine, only the serial number and names create any printing on the charge slip. The expiration date 40 is also provided on the token 12 above the signature space 35 so that the credit card company need only replace the token 12 and not the base card 11.

In use, the holder of the credit card 10 carries the base card 11 in his wallet in the conventional manner with the token 12 removed and carried in another pocket, for example, a change pocket. When it is desired to use the credit card, it is merely necessary to take the base card 11 from the wallet and the token 12 from the pocket and place the two together. The token 12 is easily secured in place by sliding it from right to left, as viewed in FIG. 1, while it is slightly deformed so that the upper and lower edges 41 and 42 thereof pass between lips 20 on the upper and lower edges 22 and 24 of the aperture 14. When the token reaches the pair of lips 20 on the left edge 23, it is slipped into position by placing the fingers on opposite sides of the card. Once the token is in place, its resilience will return it to a flat configuration so that the right edge 32 thereof drops into the aperture 14 adjacent the right edge 33. The credit card 10 is now ready for use in substantially the same manner as the conventional one-piece credit card.

After use, the holder merely deforms the right-hand portion of the token 12 so that it no longer lies in the plane of the base card 11 and then the token 12 is slipped to the left to remove it from the base card. The card 11 is returned to the wallet and the token 12 to the change pocket or other convenient place.

FIGS. 5 and 6 illustrate another embodiment of the invention wherein the primary difference from the embodiment of FIGS. 1-4 is the manner in which the token 12a is secured to the base card 11a. Accordingly, the names, numbers, and other printing on the members 11a and 12a are substantially identical to that described above and are designated with identical reference characters. The base card 11a thus has three tabs or connectors 50, 51 and 52 formed from the base card 11a so that the front edges 54 thereof project above the surface 38a of the card a distance approximately equal to the thickness of the token 12a. The connectors 50, 51 and 52 are spaced so that the left, top and bottom edges 55, 56 and 57 of the token 12a will be received thereby to hold snugly the token 12a in place.

A detent 60 is formed in the card 11a adjacent the right-hand edge 61 of the token when it is mounted on the base card 11a to prohibit the token 12a from sliding to the right, as viewed in FIG. 6. The connectors 50, 51 and 52 and the detent 60 can be easily formed from the base card 11a using known forming operations. The deformed numebers and letters 16 and 17 on the base card 11a will project a greater distance from the surface 38a of the base card in order for the upper extremities therof to lie in the same plane as those on the token for proper printing.

The token 12a can thus be easily secured to the base card 11a by sliding it under the connectors 50, 51 and 52 wherein it is held by the detent 60. Similarly, the token 12a is quickly removed by slightly deforming the token and/or base card to allow the right edge to clear the detent and then sliding the token further to the right. Otherwise, the card is used as described above.

The invention thus prohibits unauthorized use of the credit card when the wallet is lost or stolen. Another token cannot be used with the base card 11 since it will not have the embossed name 37 which is identical to the name 17 on the base card, nor will it have the two signatures of the holder for comparison. The serial number will also be incorrect. Additionally, the company issuing the credit card 10 need only issue a new token 12 every year (without the base card 11) thus saving a considerable amount in costs of materials and transportation charges.

While particular embodiments of the invention are shown, it should be understood that numerous modifications of the basic structure come within the scope of the invention. The token and the aperture can be any shape that complement each other, for example, round or triangular. Moreover, the aperture need not extend entirely through the card and other means can be provided for fastening the token to the base card.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. A two-piece safety credit card comprising, a rectangular base card of relatively thin material having the name of the holder and a portion of a serial number embossed therein so as to project above the front surface of said base card, means defining a polygonal aperture in said base, a polygonal shaped token complementary to said polygonal aperture and adapted to be received in said aperture, said token being of relatively thin material and having the name of the holder and the other portion of the serial number embossed therein so that said names can be compared when said token is secured to said base card, and connector means for releasably securing said token to said base card.

2. A two-piece safety credit card as defined in claim 1 wherein said connector means include lip means on said base card on at least three sides of said aperture, said lip means extending into said aperture and adapted to receive and hold said token in position in said aperture.

3. A two-piece safety credit card as defined in claim 1 wherein said aperture and said token are generally square in configuration.

4. A two-piece safety credit card comprising, a rectangular base card of relatively thin material having the name of the holder and first indicia embossed therein so as to project above the front surface of said base card, means defining a polygonal aperture in said base, a polygonal shaped token complementary to said polygonal aperture and adapted to be received in said aperture, said token being of relatively thin material and having second indicia therein correlated with said first indicia for comparison when said token is secured to said base card, and connector means for releasably securing said token to said base card.

5. A two-piece safety credit card as defined in claim 4 wherein said first and second indicia are different portions of a serial number.

6. A two-piece safety credit card as defined in claim 4 wherein said second indicia are the name of the credit card holder.

7. A two-piece safety credit card as defined in claim 4 wherein said separate member only bears an expiration date so that only this member is replaced periodically.

References Cited by the Examiner
UNITED STATES PATENTS

| | | | |
|---|---|---|---|
| 1,026,254 | 5/1912 | Duncan. | |
| 1,414,666 | 5/1922 | Polivka | 40—2.2 |
| 1,655,790 | 1/1928 | Krell | 101—369 |
| 2,538,137 | 1/1951 | Vogt | 101—369 |
| 2,831,427 | 4/1958 | Seifried | 101—369 |
| 3,230,650 | 1/1966 | Orkin | 40—2.2 |

FOREIGN PATENTS

| | | |
|---|---|---|
| 652,802 | 10/1928 | France. |
| 827,255 | 2/1960 | Great Britain. |

DAVID KLEIN, *Primary Examiner.*